United States Patent [19]

Iwamoto et al.

[11] 4,208,122

[45] Jun. 17, 1980

[54] REPRODUCTION APPARATUS COMPRISING SORTING DEVICE

[75] Inventors: Minoru Iwamoto; Toyoo Okamoto; Shigeru Mita, all of Tokyo, Japan

[73] Assignee: Ricoh Company, Ltd., Tokyo, Japan

[21] Appl. No.: 962,210

[22] Filed: Nov. 20, 1978

[30] Foreign Application Priority Data

Nov. 28, 1977 [JP] Japan ................................ 52-141655
Dec. 8, 1977 [JP] Japan ................................ 52-147384

[51] Int. Cl.$^2$ ........................ G03G 15/00; G03B 27/58
[52] U.S. Cl. ........................................ 355/14 R; 355/72
[58] Field of Search .................... 355/3 SH, 72, 75, 14

[56] References Cited

U.S. PATENT DOCUMENTS

| | | | |
|---|---|---|---|
| 3,669,537 | 6/1972 | Kobayashi | 355/75 X |
| 3,840,222 | 10/1974 | Fowlie et al. | 271/4 |
| 4,134,672 | 1/1979 | Burlew et al. | 355/14 |

*Primary Examiner*—Donald A. Griffin
*Attorney, Agent, or Firm*—David G. Alexander

[57] ABSTRACT

A reproduction apparatus (11) including an electrostatic copying machine (12) or the like is operative to produce single copies of a plurality of documents using an automatic document feed device (14) or a plurality of copies of a single document. The copies are discharged onto a sorting device (18); (91); (121); (141) for stacking the copies in either of two positions on a tray (23); (93); (122); (190) thereof. In the automatic feed mode the original documents, after being fed through the automatic feed device (14), are discharged into a discharge unit (19) having a cover (21). If the cover (21) is opened within a predetermined length of time to remove the documents after termination of the copying operation in the automatic feed mode the sorting device (18); (91); (121); (141) is actuated to shift the copies from one position to the other. The same operation is effected in the multiple copy mode if a next copying operation is initiated within the predetermined length of time. The sorting device (91); (121); (141) preferably includes a fixed tray (93); (122); (190) and a movable sheet engaging member (96); (129); (149) which is toggled between two stable positions for shifting the copies to one or the other of the positions on the tray (93); (122); (190). In this manner, the copies are sorted in sets in the automatic feed mode and according to the original documents in the multiple copying mode.

17 Claims, 13 Drawing Figures

REPRODUCTION APPARATUS COMPRISING SORTING DEVICE

BACKGROUND OF THE INVENTION

The present invention relates to a reproduction apparatus comprising an electrostatic copying machine or the like and a sorting means for receiving copies discharged by the copying machine in either of two positions on the sorting means. The present invention may be applied to any type of reproduction apparatus which produces reproductions of original documents in sheet form such as an offset printing machine, a mimeograph machine, etc.

A prior art example of such an apparatus is disclosed in Japanese patent publication No. 44-2169 and comprises an electrostatic copying machine which discharges copies into a sorting unit having a tray which is horizontally pivotal between two positions. After a copying operation is completed and the one or more copies of a single original document have been discharged into the tray, an electrical sort signal is generated causing the tray to pivot from whichever position it currently occupies to the other position. This operation will be herein referred to as toggling. After one or more copies are produced of the next original document and the copies are discharged into the tray, the tray is toggled to the other position. In this manner, the copies of the first document are stacked in one position on the tray while the copies of the second document are stacked in a second position on the tray which is angularly offset from the first position. The copies of the third document are stacked in the first position, the copies of the fourth document are stacked in the second position, etc. In other words, the copies are sorted according to the original documents.

Although this prior art apparatus has utility in some applications, it suffers from several problems and is not applicable to all modes of operation of a typical electrostatic copying machine. Since the tray is toggled after each copying operation, the sorting operation is meaningless where only one copy is produced of each original document. In such a case the sorting operation is a nuisance since the copies are received on the tray in alternating positions and must be aligned by hand after all the copies have been produced.

In an electrostatic copying machine provided with an automatic original document feed unit or device, the sorting operation of the prior art apparatus is not only undesirable for the reason stated immediately hereinabove but also because since in an automatic copying operation it is desirable to sort the copies in sets. In other words, a plurality of original documents are fed through the feed unit sequentially and a single copy is made of each document. Typically, the documents will be pages of a manuscript and therefore constitute a set. It is desired to stack all of the copies of the set in one position, toggle the tray and then stack the copies of the next set of documents in the other position. However, the prior art apparatus is not capable of this operation but instead meaninglessly toggles the tray after each copy is produced.

In accordance with the normal operation of such a prior art apparatus, the tray is toggled after the last copy is produced. This final operation is not only unnecessary but may cause injury to an inexperienced apparatus operator who attempts to remove the copies from the tray as the tray is being toggled. This problem will occur most frequently when a new operator makes only one copy of a single document, since the movement of the tray will be completely unexpected.

Another problem with such a prior art apparatus lies in the basic design of the sorting unit. Since the tray, which protrudes externally from the copying machine and is large in size, is toggled repeatedly, there is a substantial danger that a part of the body or clothing of the operator will become entangled in the mechanism and be damaged. Due to the large size of the tray, a large force is required to toggle the same. As yet another hazard, due to the large size of the tray and the large pivotal moment which can be applied thereby to the drive mechanism as the result of the operator or some object bumping the tray, the drive mechanism is subject to constant damage.

SUMMARY OF THE INVENTION

A reproduction apparatus in accordance with the present invention includes a reproduction machine and sorting means, the reproduction machine reproducing original documents on sheets and discharging the sheets onto the sorting means, the sorting means having means movable so as to stack the sheets in a first position or a second position on the sorting means and being toggled between the first and second positions in response to electrical sort signals. Control means produce a sort signal after termination of a reproduction operation by the reproduction machine when a predetermined operation is performed within a predetermined length of time after said termination.

It is an object of the present invention to provide a reproduction apparatus comprising a sorting unit which can sort copies either in accordance with the original documents or in sets as required. It is another object of the present invention to provide a reproduction apparatus which eliminates an unnecessary final copy sorting operation and the accompanying safety hazard.

It is another object of the present invention to provide a reproduction apparatus which eliminates meaningless sorting where only one copy is produced of each of a plurality of original documents.

It is another object of the present invention to provide a reproduction apparatus comprising a sorting unit having a fixed tray and means for stacking sheets discharged by a reproduction machine in either of two positions on the tray.

It is another object of the present invention to provide a reproduction apparatus comprising a sorting unit which is safer in operation and requires less operating power than comparable apparatus known heretofore.

It is another object of the present invention to provide a generally improved reproduction apparatus.

Other objects, together with the following, are attained in the embodiments described in the following description and shown in the accompanying drawing.

DESCRIPTION OF THE PREFERRED EMBODIMENTS

While the reproduction apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
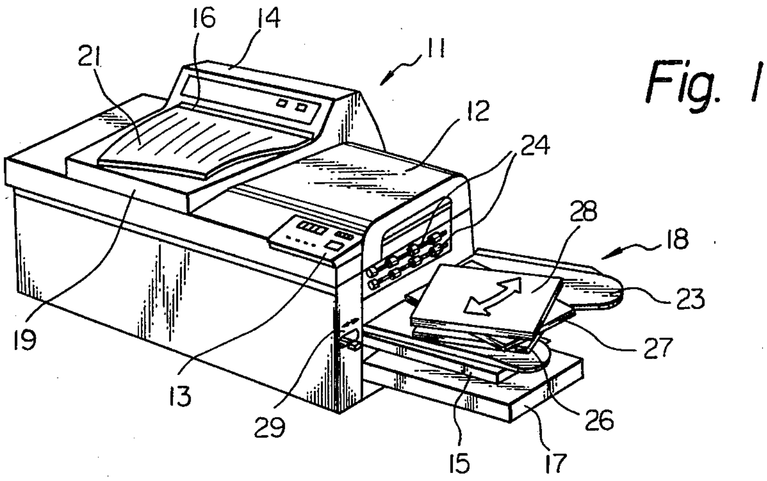
FIG. 1 is a perspective view of a reproduction apparatus embodying the present invention.

Referring now to FIG. 1 of the drawing, a reproduction apparatus embodying the present invention is generally designated by the reference numeral 11 and comprises an electrostatic copying machine 12. The copying machine 12 is provided with a control panel 13 by which an operator may control the operation thereof.

Although not visible in the drawing, the copying machine 12 comprises a transparent platen on which original documents are placed face down for copying. In an automatic feed mode, original documents in sheet form are sequentially inserted into an inlet 16 of an automatic feed unit or device 14 and fed thereby over the platen. A light image of each document is radiated onto a photoconductive drum (not visible) to form an electrostatic image which is developed with a toner substance to form a toner image. A copy sheet is fed from a cassette 15 or 17 into engagement with the drum and the toner image is transferred thereto. The toner image is fixed to the copy sheet to form a permanent reproduction of the original document and the finished copy discharged into a sorting device or unit 18.

Figure 2:
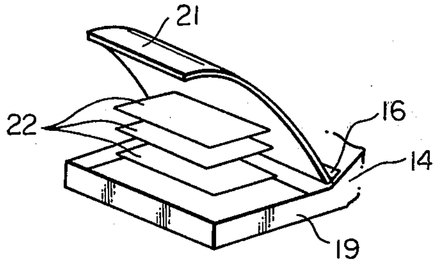
FIG. 2 is a perspective view of an original document discharge portion of the apparatus.

Original documents 22, after being scanned, are stacked in a discharge portion 19 of the feed device 14 in a manner diagrammatically illustrated in FIG. 2. After all of the documents have been fed through the device 14 and scanned, a cover 21 is opened to permit removal of the documents.

The feed device 14 may be tilted upwardly and backwardly away from the upper surface of the copying machine 12, although not illustrated, to expose the platen. Original documents in sheet or book form may be placed on the platen and scanned to produce one or more copies thereof.

The sorting device 18 comprises a tray 23 which is pivotal between first and second stable positions. More specifically, in response to an electrical sort signal from the copying machine 12, the tray 23 is pivoted by a drive means (not shown) from whichever position it currently occupies to the other position. This operation will be referred to herein as toggling, since the tray 23 is toggled by the sort signals.

The apparatus 11 is operative in several different copying modes, as will be described in detail below.

Automatic Feed Mode

In this mode the original documents are fed through the feed device sequentially and one copy is made of each document. The tray 23 is maintained in one of its two stable positions and the finished copies are discharged straight out of the copying machine 12 onto the tray 23 by rollers 24. The copies are stacked in alignment with each other on the tray 23.

After all of the documents of one set have been copied, the operator opens the cover 21 to remove the same. Assuming that the last copy has been discharged onto the tray 23, in one form of the invention the tray 23 is toggled to the other position if the cover 21 is opened within a predetermined length of time after the last copy sheet is discharged onto the tray 23. In another form of the invention, the tray 23 is not toggled unless another original document is inserted into the inlet 16 within the predetermined length of time assuming that the cover 21 has previously been opened.

As the result of pivoting the tray 23 from one position to the other position, the first set of copies are stacked on the tray 23 in a position angularly displaced from the direction of discharge of the copies from the copying machine 12 onto the tray 23.

Assuming that the tray 23 has been toggled and another set of original documents is to be copied, the copies produced from the next set of documents are discharged straight out of the copying machine 12 and stacked in alignment with each other but angularly displaced from the first stack of copy sheets. A third set of copies, after toggling the tray 23 a second time, will be stacked on top of the second stack of copies in alignment with the first stack of copies. First, second and third stacks of copies are designated as 26, 27 and 28 in FIG. 1.

In accordance with this operation, the copies are sorted in accordance with the sets of original documents. The sets of copies produced from alternating sets of documents will be alternatingly stacked in the first and second positions respectively on the tray 23.

Single Copy Mode

Where only one copy is to be made of each of a plurality of original documents, such as pages of a book, the feed device 14 is tilted away from the copying machine 12 and the first document is placed on the platen and copied. Then, the second document is placed on the platen and copied, followed by the third document, fourth document, etc. In this mode of operation the sorting unit 18 is rendered inoperative.

Multiple Copy Mode

In this mode of operation it is desired to make a plurality of copies of each of several original documents. The feed unit 14 is tilted away from the copying machine 12 and the first document is placed on the platen. The operator sets a dial (not designated) on the control panel 13 indicating the number of copies to be produced of the first document and then presses a print button (not designated) on the control panel 13 to initiate the copying operation. The copying machine 12 produces the desired number of copies and discharges them into the tray 23. If only one document is to be copied, the sorting unit 18 is maintained inoperative thereby eliminating the unnecessary sorting operation. However, if another original document is copied within a predetermined length of time after discharge of the last copy of the first document, the tray 23 will be toggled prior to discharge of the first copy of the second document. Assuming that a third document is copied, the tray 23 will be again toggled after the last copy of the second document is discharged. In this manner, the copies of the first document will be stacked in alignment with each other on the tray 23. The copies of the second document will be stacked in alignment with each other but angularly displaced from the copies of the first document. The copies of the third document will be stacked in alignment with each other and further in alignment with the copies of the first document, etc. Thus, in the multiple copying mode the copies are sorted in accordance with the original documents.

Further illustrated is a lever 29 which allows the operator to manually move the tray 23 from one position to the other. For ease of manufacture and transport, the sorting unit 18 and feed unit 14 are preferably detachably mounted on the copying machine 12.

Figure 3:
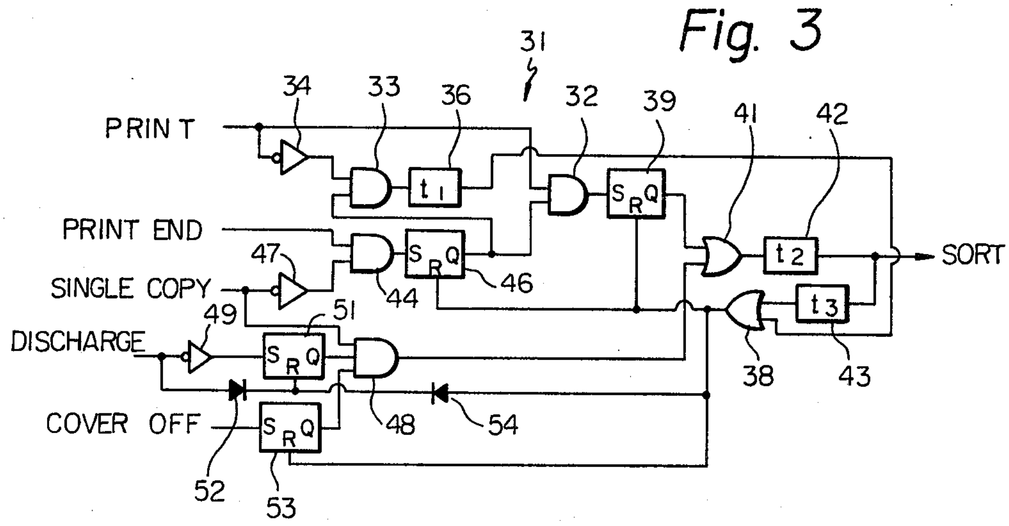
FIG. 3 is an electrical schematic diagram of a control circuit of the present apparatus.

A control circuit 31 for producing electrical SORT signals for toggling the tray 23 of the sorting device 18 is illustrated in FIG. 3. A PRINT signal is generated by the copying machine 12 when the operator presses the print button to begin a copying operation. The PRINT signal is applied to an input of an AND gate 32 and also to an input of an AND gate 33 through an inverter 34. The output of the AND gate 33 is connected to an input of a timer 36, the output of which is connected to an input of an OR gate 38. The output of the AND gate 32 is connected to a set input of a flip-flop 39, the Q output of which is connected to an input of an OR gate 41. The output of the OR gate 41 is connected to an input of a timer 42, the output of which constitutes the SORT signal and is connected to an input of a timer 43. The output of the timer 43 is connected to another input of the OR gate 38.

A PRINT END signal is generated by the copying machine 12 when the last copy has been produced and is fed to an input of an AND gate 44. The output of the AND gate 44 is connected to the set input of a flip-flop 46, the output of which is connected to inputs of the AND gates 32 and 33.

The copying machine 12 produces a SINGLE COPY signal whenever only one copy is to be produced of each original document and feeds the same to another input of the AND gate 44 through an inverter 47 and directly to an input of an AND gate 48. The copying machine 12 further produces a DISCHARGE signal while a copy sheet is being discharged from the copying machine 12 into the tray 23. The DISCHARGE signal is applied through an inverter 49 to the set input of a flip-flop 51 and through a diode 52 to the reset input of the flip-flop 51. The Q output of the flip-flop 51 is connected to another input of the AND gate 48, the output of the AND gate 48 being connected to another input of the OR gate 41.

The copying machine 12 yet further produces a COVER OFF signal when the cover 21 is open. The COVER OFF signal is applied to a set input of a flip-flop 53, the Q output of which is connected to yet another input of the AND gate 48. The output of the OR gate 38 is connected to reset inputs of the flip-flops 39, 46 and 53 and is also connected to the reset input of the flip-flop 51 through a diode 54.

The operation of the circuit 31 will now be described with reference being made to FIGS. 3 and 4 for a multiple copying operation.

Multiple Copy Mode

In the multiple copy mode in which it is desired to make a plurality of copies of a single original document, the SINGLE COPY signal is low, enabling the AND gate 44 and inhibiting the AND gate 48. After the last copy is produced, the PRINT END signal is generated and passed through the AND gate 44 to set the flip-flop 46. The high Q output of the flip-flop 46 triggers the timer 36 through the AND gate 33 since the PRINT signal is low and enables the AND gate 33 through the inverter 34. The timer 36 is constructed in such a manner that it is triggered by the leading edge of a logically high input signal but is rendered inoperative if the input signal goes logically low.

The high output of the flip-flop 46 enables the AND gate 32. Assuming that another PRINT signal is generated (another copying operation is initiated) before the timer 36 times out, the PRINT signal will be gated through the AND gate 32 to set the flip-flop 39 and trigger the timer 42 through the OR gate 41. A time period t2 of the timer 42 is selected to be long enough to ensure that the last copy is discharged onto the tray 23. At the expiration of the time period t2, the timer 42 produces the SORT signal which causes the tray 23 to be toggled. The SORT signal triggers a timer 43 which produces a high output signal at the end of a short time period t3. The output signal of the timer 43 resets the flip-flops 39, 46, 51 and 53 through the OR gate 38.

It will be noted that the trailing edge of the second PRINT signal causes the timer 36 to be triggered since the output of the AND gate 33 goes high. However, the flip-flop 46 is reset by the output signal of the timer 43, causing the output of the AND gate 33 to go low and disable the timer 36.

Figure 4:
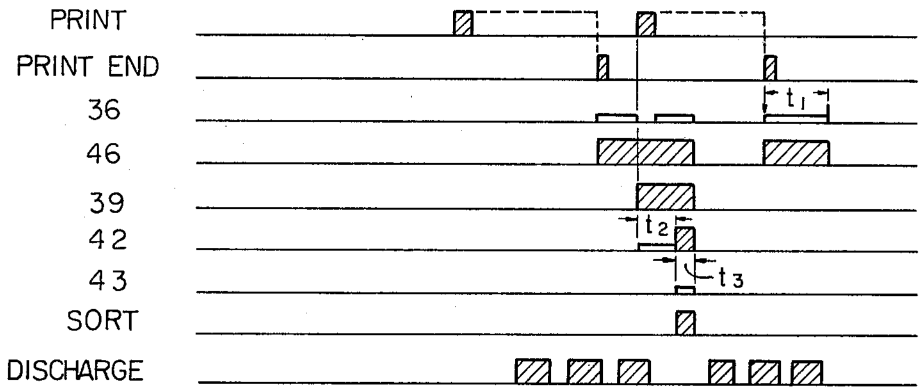
FIGS. 4 and 5 are timing diagrams illustrating the operation of the circuit of FIG. 3.

Assuming that, as shown in FIG. 4, three copies are to be made of each of two documents, the tray 23 will be toggled in response to the second PRINT signal. However, after the three copies are made of the second document, no PRINT signal will be produced. At the expiration of a time period t1, the timer 36 produces a high output which resets the flip-flops 39, 46, 51 and 53. This signal is gated through the OR gate 38, and renders the circuit 31 inoperative to toggle the tray 23. Thus, the tray 23 will not be toggled after the last copying operation, enabling the operator to remove the copy sheets from the tray 23 without danger.

Automatic Feed Mode

Figure 5:
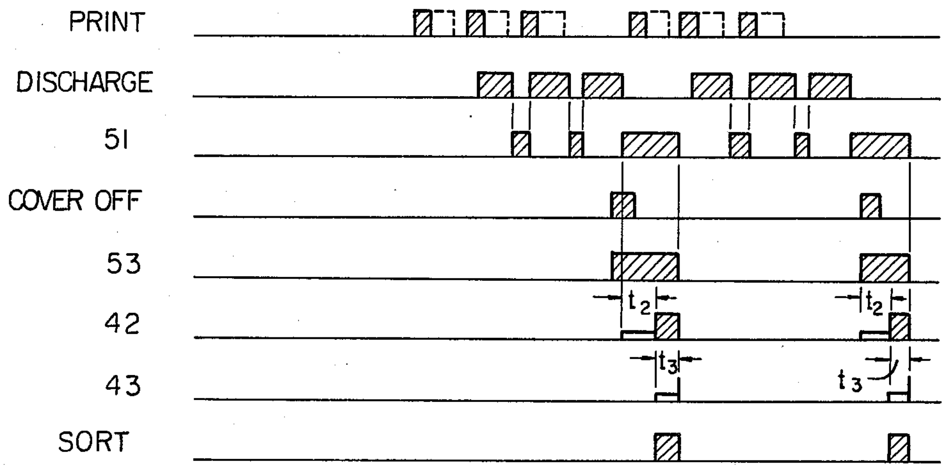

In the automatic feed mode it is only possible to produce a single copy of each original document and the documents are to be sorted in sets. The SINGLE COPY signal is high, enabling the AND gate 48 and inhibiting the AND gate 44. As illustrated in FIG. 5, the flip-flop 51 is set by the trailing edges of the DISCHARGE signals and reset by the leading edges of the DISCHARGE signals due to the action of the inverter 49. Thus, the output of the flip-flop 51 is high whenever a copy sheet is not in the process of being discharged by the copying machine 12. After the last copy of the first set of documents is produced, the operator opens the cover 21 to remove the documents. Assuming the exemplary case of FIG. 5, two sets of three documents each are to be copied. After the third copy of the first set is produced and the cover 21 opened, the COVER OFF signal goes high and sets the flip-flop 53. As illustrated, the cover 21 is opened while the third copy is being discharged. Thus, although the AND gate 48 is enabled by the high Q output of the flip-flop 53, it does not produce a high output until the third copy is completely discharged and the output of the flip-flop 51 goes high. The high output of the AND gate 48 is gated through the OR gate 41 to trigger the timer 42. At the end of the time period t2 the timer 42 produces a high output which constitutes the SORT signal and causes the tray 23 to be toggled. The SORT signal also triggers the timer 43 which produces a high output at the end of the time period t3 to reset the flip-flops 39, 46, 51 and 53.

Further in accordance with the illustrated example, the cover 21 is opened again by the operator after the third copy of the second set of documents has been completely discharged. At this time the DISCHARGE signal is low and the output of the flip-flop 51 is high, enabling the AND gate 48. Thus, the output of the AND gate 48 goes high to trigger the timer 42 as soon as the cover 21 is opened, the COVER OFF signal goes high and the flip-flop 53 produces a high Q output.

It will be noted that in the multiple copy mode the copies are sorted in accordance with the original documents and that the tray 23 is toggled in response to the PRINT signal for producing the first copy of the next document if the PRINT signal is produced within the time period t1 of the timer 36. The tray 23 will not be toggled if another document is not copied or if the time period t1 elapses before the next document is copied. In the automatic feed mode, the tray 23 is toggled in response to opening the cover 21, regardless of whether another set of documents is to be copied. This operation is safe in that the toggling operation is performed while the operator is removing the original documents from the feed device 14 and his hands are away from the tray 23.

Single Copy Mode

In the single copy mode it is desired to disable the sorting unit 18. This is accomplished in the following manner.

The high SINGLE COPY signal inhibits the AND gate 44 and thereby prevents generation of a SORT signal in response to a PRINT signal. Although the high SINGLE COPY signal enables the AND gate 48, the feed device 14 is tilted away from the copying machine 12 and cannot produce a COVER OFF signal. Thus, the output of the AND gate 48 cannot go high to trigger the timer 42 since the Q output of the flip-flop 53 cannot go high. The low output of the flip-flop 53 inhibits the AND gate 48.

Figure 6:
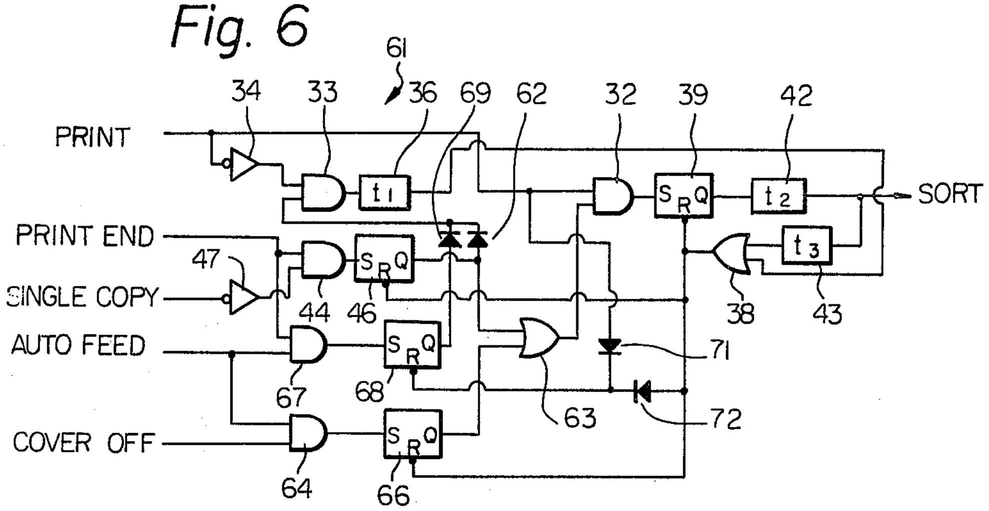
FIG. 6 is an electrical schematic diagram of a second control circuit of the present apparatus.

FIG. 6 illustrates another control circuit 61 of the present invention which functions to eliminate a final sorting or toggling operation in the automatic feed mode. Like elements are designated by the same reference numerals used in FIG. 3. Only the differences between the circuit 31 and the circuit 61 will be described hereinbelow.

The OR gate 41 is omitted and the Q output of the flip-flop 39 is connected directly to the input of the timer 42. The Q output of the flip-flop 46 is connected to the input of the AND gate 33 through a diode 62 and to the input of the AND gate 32 through an OR gate 63.

The COVER OFF signal is applied to an input of an AND gate 64, the output of which is connected to the set input of a flip-flop 66. The Q output of the flip-flop 66 is connected to another input of the OR gate 63. The output of the OR gate 38 is connected to the reset input of the flip-flop 66.

The PRINT END signal is applied to an input of an AND gate 67, the output of which is connected to the set input of a flip-flop 68. The Q output of the flip-flop 68 is connected to the same input of the AND gate 33 as the Q output of the flip-flop 46 through a diode 69. The PRINT signal is applied to the reset input of the flip-flop 68 through a diode 71. The output of the OR gate 38 is connected to the reset input of the flip-flop 68 through a diode 72. The copying machine 12 generates an AUTO FEED signal when the feed device 14 is operatively positioned on top of the copying machine 12. The AUTO FEED signal is applied to inputs of the AND gates 64 and 67.

The circuit 61 operates as follows.

Multiple Copy Mode

In the multiple copy mode the operation of the circuit 61 is the same as the circuit 31. The AUTO FEED signal is low, inhibiting the AND gates 64 and 67.

Automatic Mode Feed

Figure 7:
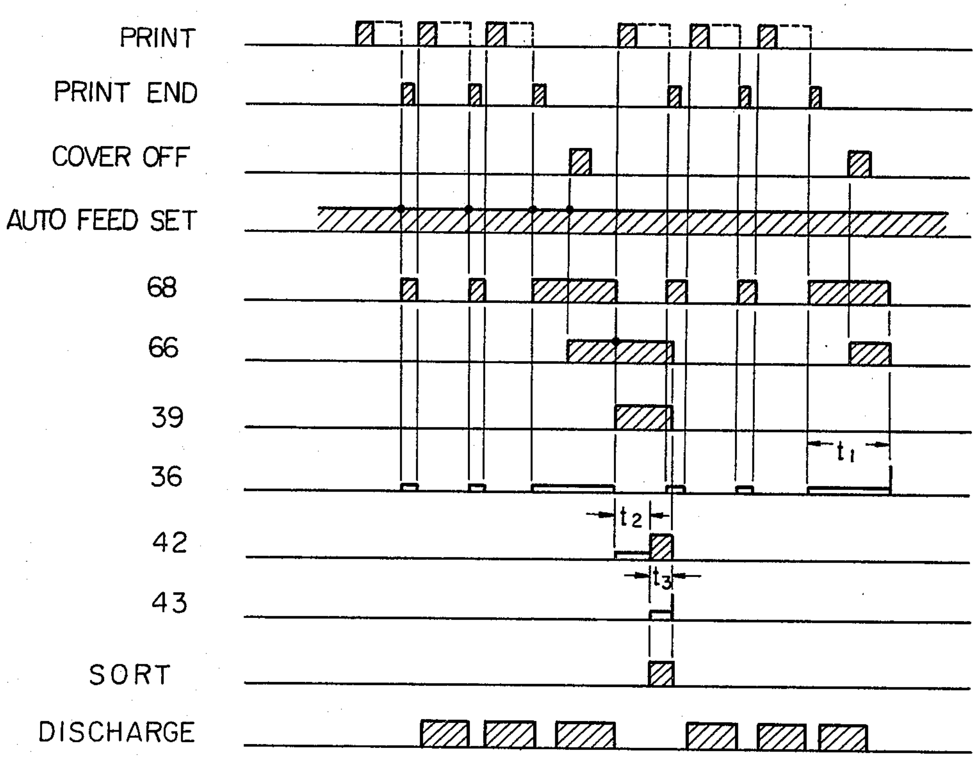
FIG. 7 is a timing diagram illustrating the operation of the circuit of FIG. 6.

The high SINGLE COPY signal inhibits the AND gate 44 through the inverter 47. The AUTO FEED signal is high, enabling the AND gates 64 and 67. An exemplary automatic feed copying operation is illustrated in FIG. 7. A PRINT END signal is produced after each copy is made and sets the flip-flop 68 through the AND gate 67. However, the flip-flop 68 will be reset by a following PRINT signal via the diode 71.

Assuming that the last copy of the first set is produced, the PRINT END signal will set the flip-flop 68, the high output of which will set the timer 36 through the diode 69 and AND gate 33. Opening of the cover 21 will set the flip-flop 66 through the AND gate 64, the high output of which will enable the AND gate 32 via the OR gate 63. If the next copying operation is initiated for copying the next set of documents, the first PRINT signal will be gated through the AND gate 32 to set the flip-flop 39 and trigger the timer 42. The timer 42 will produce the SORT signal at the end of the time period t2. The timer 43 will be triggered by the SORT signal and reset the flip-flops 39, 46, 66 and 68 at the end of the time period t3. In other words, the cover 21 must be opened and the next copying operation initiated thereafter within the time period t1 in order to produce the SORT signal and toggle the tray 23.

If another set of documents is not to be copied or the next copying operation is not initiated within the time period t1, the timer 36 will generate a high output at the end of the time period t1 to reset the flip-flops 39, 46, 66 and 68 and thereby prevent the tray 23 from being toggled. In a case where only one set of documents is to be copied, the circuit 61 will prevent a final sorting or toggling operation in the desired manner.

Single Copy Mode

The high SINGLE COPY signal inhibits the AND gate 44. The low AUTO FEED signal inhibits the AND gates 64 and 67, thereby preventing generation of a SORT signal.

It will be noted that in the circuit 61 the timer 36 is set in both the multiple copy mode and the auto feed mode in response to the PRINT END signal through setting of the flip-flops 46 and 68 respectively. Whereas the AND gate 32 and thereby the timer 42 are enabled in response to the PRINT END signal in the multiple copy mode, the AND gate 32 and the timer 42 are enabled in response to the COVER OFF signal in the automatic feed mode. The SORT signal is generated in both the multiple copy mode and the automatic feed mode in response to the PRINT signal, but only if the AND gate 32 is enabled in the manner indicated above. Enabling of the AND gate 32 constitutes enabling of the timer 42 since the flip-flop 39 cannot be set to produce a high Q output and trigger the timer 42 unless the output of the AND gate 32 goes high.

Figure 8:
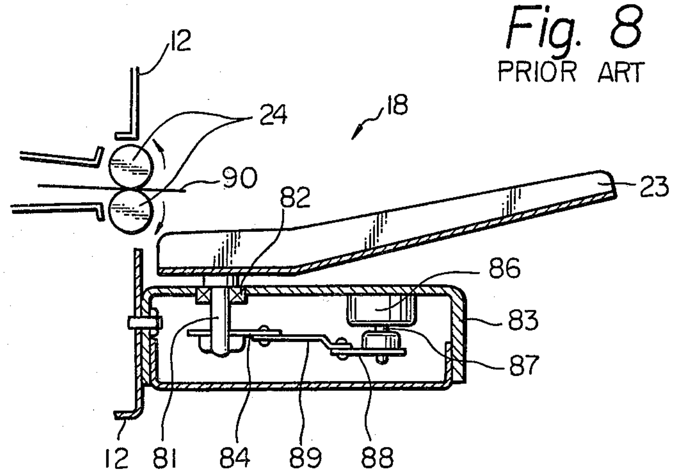
Fig. 8 PRIOR ART
FIG. 8 is an elevational view of a prior art sorting device.

FIG. 8 shows the sorting device 18 which, although known in the art, may be used in a novel combination with the circuit 31 or 61. The tray 23 is attached to the end of an upstanding shaft 81 which is pivotally supported by means of a bearing 82 on the upper surface of a housing 83 of the sorting device 18 which is detachably mounted to the end of the copying machine 12. A rocker arm 84 is fixed to the lower end of the shaft 81. An electric motor 86 is fixed to the lower surface of the upper wall of the housing 83 and has a downwardly extending shaft 87. An arm 88 is fixed to the lower end of the shaft 87. The ends of the arms 84 and 88 are pivotally connected to the opposite ends of a link 89. The arms 84 and 88, link 89 and shaft 81 constitute a four bar linkage mechanism of the crank-rocker type in that rotation of the shaft 87 causes rocking of the arm 84, pivotal reciprocation of the shaft 81 and rocking of the tray 23.

Although not shown, the shaft 87 is provided with a cam and switch mechanism designed to maintain the motor shaft 81 and thereby the tray 23 in either of two stable positions. In these two positions the tray 23 is angularly displaced from the direction of discharge of the sheets from the copying machine 12 to a maximum extent in opposite respective directions. A first SORT signal will energize the motor 86 and cause the tray 23 to rock or pivot from the first position to the second position. A second SORT signal will energize the motor 86 to rock or pivot the tray 23 from the second position to the first position, etc. The reference numeral 90 designates a copy sheet being discharged into the tray 23.

Figure 9:
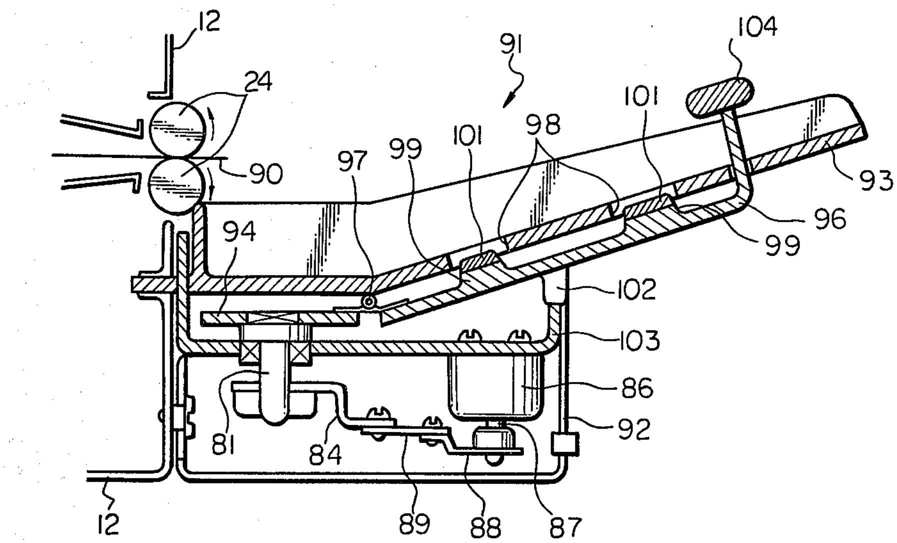
FIG. 9 is an elevational view of a sorting device or unit embodying the present invention.
Figure 10:
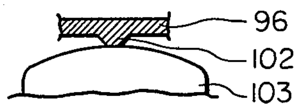
FIG. 10 is a schematic view of a cam arrangement of the device of FIG. 9.

FIGS. 9 and 10 illustrate a novel and unique sorting device 91 of the present invention which overcomes the drawbacks of the prior art described above and comprises a housing 92. A crank-rocker mechanism comprising the same components as the device 18 is provided inside the housing 92, with like elements being designated by the same reference numerals. However, in the device 81 a tray 93 is detachably but fixedly mounted above the housing 92 and a rocker plate 94 is fixed to the upper end of the shaft 81. An engaging member or arm 96 is connected to the rocker plate 94 by a hinge 97 and is thereby pivotal about the hinge 97 in the vertical direction. The tray 93 is formed with transversely elongated slots 98 therethrough. The engaging arm 96 is formed with upwardly extending projections 99 on which are provided pads 101 of a high friction material such as rubber. The pads 101 are extendable through the slots 98 above the upper surface of the tray 93.

A downwardly extending projection 102 which functions as a cam follower is formed on the lower surface of the arm 96. The upper right edge of the housing 92 is formed with an upwardly extending convex portion 103 which constitutes a cam or guide. The projection 102 rests on the cam 103. The arm 96 is further provided with a knob 104 for manual operation.

The arm 96 is arranged to be movable between two stable positions which are angularly displaced from the direction of discharge of the sheets from the copying machine 12 to a maximum extent in opposite directions respectively. As the arm 96 is moved from one position to the other, the arm 96 is raised by the cam 103 so that the pads 101 extend upwardly through the slots 98 into frictional engagement with the sheets on the tray 93 only in the central portion of the slots 98. In this manner, the sheets are displaced by the pads 101 and shifted in the transverse direction of movement of the arm 96. Thus, sheets subsequently discharged onto the tray 93 are angularly displaced from the sheets previously discharged onto the tray 93. Toggling of the arm 96 between the two stable positions will alternatingly cause the sheets to be shifted in opposite directions respectively and thereby be stacked on the tray 93 in either of two respective positions.

Figure 11:
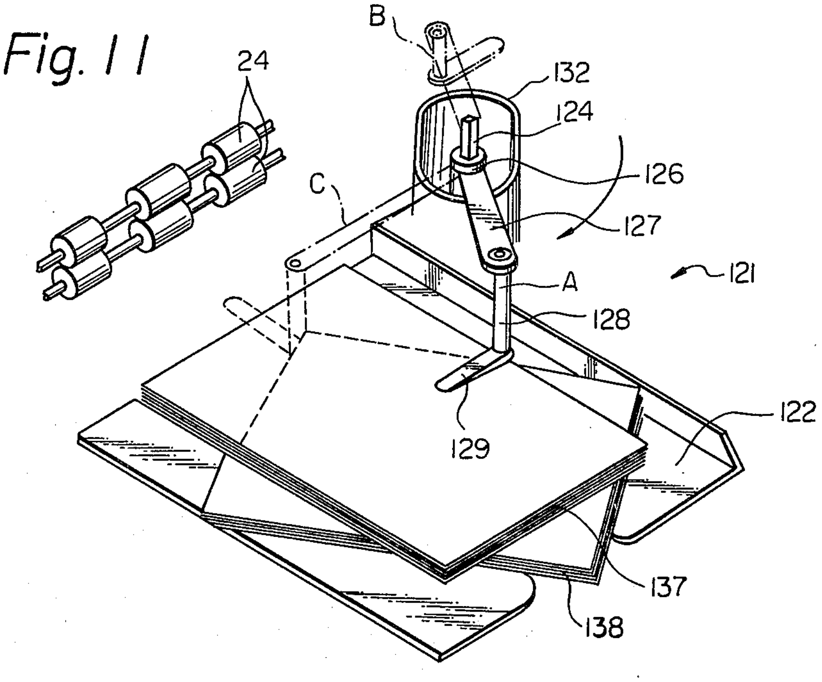
FIG. 11 is a perspective view of another sorting device of the present invention.
Figure 12:
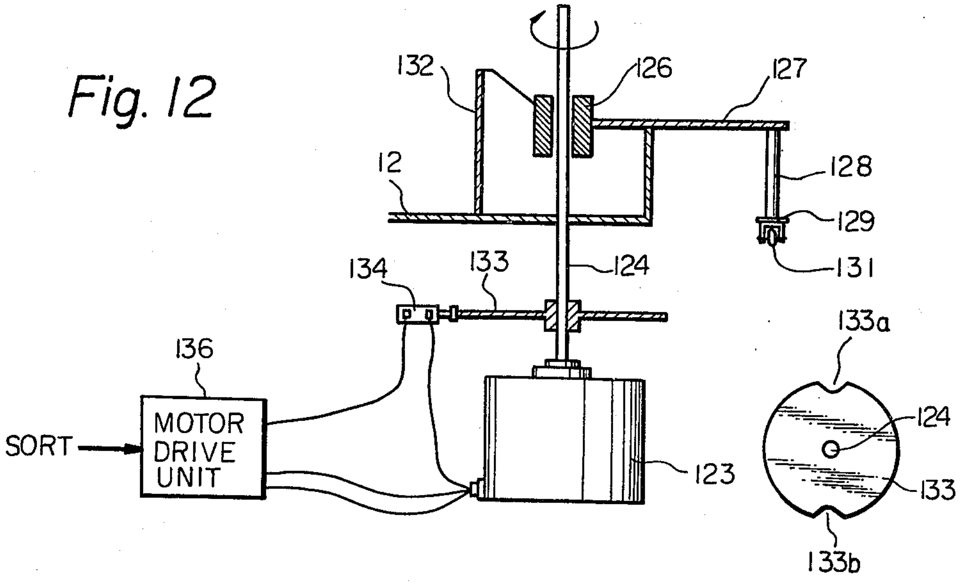
FIG. 12 is a schematic elevational view of the sorting device of FIG. 11.

Another sorting device 121 of the present invention is illustrated in FIGS. 11 and 12 and comprises a fixed tray 122. An electric motor 123 is fixedly mounted adjacent to one edge of the tray 122 and has an upstanding square shaft 124. A collar 126 having a square hole conjugate to the shaft 124 is fit on the shaft 124 so as to be vertically slidable thereon but rotatable integrally therewith. A horizontal arm 127 is fixed to the collar 126. A rod 128 is fixed to the end of the arm 127 and extends downwardly therefrom. An engaging member or claw 129 is fixed to the lower end of the rod 128. A roller 131 is mounted at the lower end of the rod 128.

A guide tube or cam 132 coaxially surrounds the shaft 124 for vertically positioning the claw 129. This is accomplished since the lower surface of the arm 127 is normally supported by the upper guide edge of the cam 132. The upper edge of the cam 132 is lower in a portion adjacent to the tray 122 than in a portion spaced therefrom.

A switch actuating cam 133 in the form of a disc is fixed to the shaft 124 and is formed with cutouts **133*a* and 133*b*. An actuator of a microswitch 134 engages the edge of the cam 133 and is actuated thereby. The SORT signal is applied to a motor drive unit 136 which is connected to the microswitch 134 and motor 123**.

The shaft 124 is rotatable clockwise by the motor 123 so that the claw 129 and the other elements fixed thereto are toggled between a first stable position A illustrated in solid line and a second stable position B illustrated in broken line. In the second position B the claw 29, etc. are oriented away from the tray 122 and elevated by means of engagement of the arm 127 with the upper portion of the cam 132. Thus, copy sheets discharged from the copying machine 12 into the tray 122 will be stacked straight as indicated at 137. In response to a SORT signal the drive unit 136 will cause the shaft 124 to rotate the claw 129, etc. to the first position A. The roller 131 rides on the surface of the top sheet on the tray 122 and the claw 129 is positioned above the sheets as shown. When there are a large number of sheets on the tray 122, the vertical position of the claw 129, etc. will be determined by the vertical position of the top sheet since the roller 131 will abut against the top sheet and prevent further downward movement of the claw 129, etc. In this case, the arm 127 will separate from the cam 132.

In the position A the sheets are discharged onto the claw 129. In response to a SORT signal, the motor 126 will rotate the claw 129, etc. through an intermediate position C illustrated in broken line to the position B. In the course of movement from the position A to the position B, the rod 128 will push or displace the sheets stacked on the claw 129 angularly to a position indicated at 138. The rod 128 will clear the sheets at the position C and be elevated by the cam 132 to the position B. It will be seen that this movement causes the sheets to be rotated since the rod 128 engages the edges of the sheets between the center thereof and the rollers 24. In other words, the sheets are rotated counterclockwise by the rod 128. Toggling of the claw 129, etc. between the positions A and B causes the sheets to be alternatingly received in the tray 122 in the positions 137 and 138 and thereby sorted.

The cutouts 133*a* and 133*b* engage the microswitch 134 when the claw 129, etc. are in the positions A and B respectively. In these positions the microswitch 134 is open. Movement of the cam 133 away from these positions closes the microswitch 134.

The motor drive unit 136 comprises, although not shown, a power source which is connected in series with the motor 123 and microswitch 134. In response to a SORT signal, a switch in the motor drive unit 136 shorts out the microswitch 134 for a predetermined length of time which is selected to be long enough for the cam 133 to rotate sufficiently to close the microswitch 134. Subsequent engagement of the other cutout 133*a* or 133*b* with the microswitch 134 will cause the microswitch 134 to open and stop movement of the claw 129, etc. in the other stable position.

Figure 13:
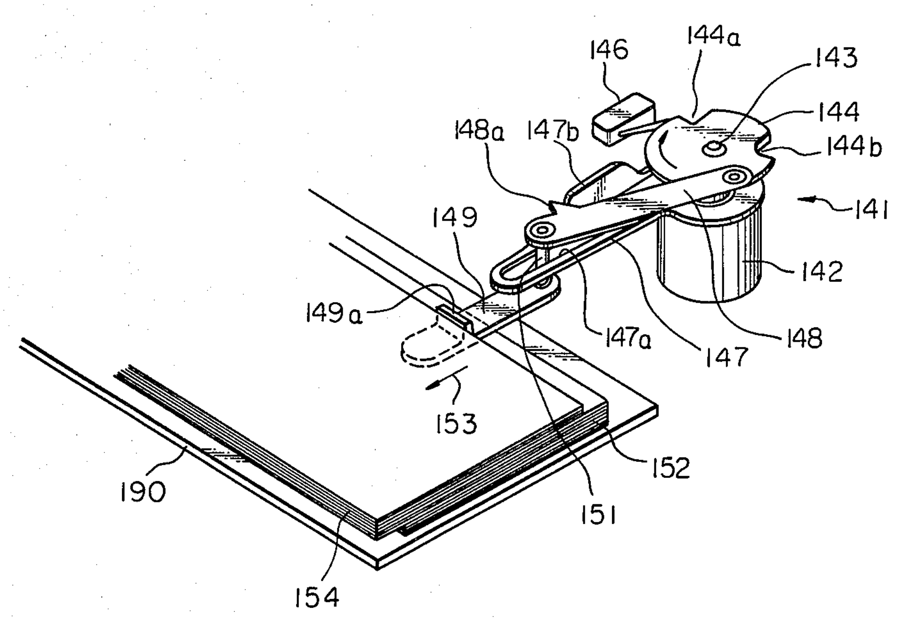
FIG. 13 is a perspective view of another sorting device embodying the present invention.

FIG. 13 shows yet another sorting device 141 embodying the present invention. The sorting device 141 comprises an electric motor 142 having a shaft 143. A disc cam 144 having cutouts 144*a* and 144*b* is fixed to the end of the shaft 143. A microswitch 146 is actuated by the cam 144.

A guide member 147 is fixedly mounted on the casing (not designated) of the motor 142 and is formed with an elongated slot 147*a*. A portion of the guide member 147 is bent upwardly as indicated at 147*b* to constitute a cam. A link 148 is pivotally connected to the cam 144 at a position suitably spaced from the shaft 143. An engaging pawl 149 is pivotally connected to the link 148 by means of a pin 151 which extends downwardly through the slot 147*a*. A portion 148*a* of the link 148 rests on the cam 147*b* and constitutes a cam follower. The pawl 149 is formed with an upstanding projection 149*a*.

The cam 144, link 148, pin 151 and pawl 149 constitute a crank-slider linkage mechanism which is driven by the motor 142. Rotation of the motor shaft 143 in the clockwise direction causes the pawl 149 to reciprocate linearly. This is because the pin 151 is guided by the slot 147*a*.

The microswitch 146 is actuated by the cam 144 in the same manner as previously described with reference to the device 121. Sheets are discharged from the copying machine 12 onto a position indicated at 152 on a tray 190. With the cutout 144*b* engaged with the microswitch 146 the pawl 149 is maintained in a first stable position spaced from the sheets 152 in a direction opposite to an arrow 153. In other words, the pawl 149 is clear of the sheets being discharged from the copying machine 12. In response to a SORT signal the motor 142 is energized until the cutout 144*a* engages the microswitch 146 and the pawl 149 attains a second position on top of the sheets on the tray 190. In the second position sheets discharged from the copying machine 12 will be stacked on the portion of the pawl 149 leftwardly of the projection 149. In response to a SORT signal the cam 144 will be rotated clockwise causing the pawl 149 to move further in the direction of the arrow 153. The projection 149*a* will engage the edges of the sheets stacked on the pawl 149 and push them as indicated at 154. Further rotation of the cam 144 will cause the pawl 149 to be retracted opposite to the direction of the arrow 153 back to the first stable position. Thus, the sheets stacked on the pawl 149 are pushed to a position displaced from the position of the sheets discharged directly on the tray 190 with the pawl 149 in the first stable position. In this manner, in response to SORT signals the pawl 149 is toggled between the first and second stable positions to cause the sheets to be alternatingly stacked in the positions 152 and 154 on the tray 190.

As the pawl 149 moves in the direction of the arrow 153 the cam follower 148*a* of the link 148 rides down the left edge of the cam 147*b*, thereby lowering the pawl 149 onto the sheets. As the pawl 149 moves opposite to the direction of the arrow 153, the cam follower 148*a* rides up the cam 147*b* causing the pawl 149 to be raised. Thus, the pawl 149 is elevated in the first stable position and lowered in the second stable position.

In summary, it will be seen that the present invention provides a reproduction apparatus comprising a sorting device which overcomes the drawbacks of the prior art. The present apparatus is capable of sorting copies either in sets or in accordance with the original documents, and eliminates an unnecessary hazardous final sorting operation. The sorting unit is detachable for ease of manufacture and shipping and facilitates modular construction of a product line of reproduction machines, some of which do not comprise the sorting unit. The drive power for the sorting unit is greatly reduced compared to the prior art since only a small arm is moved rather than a large tray. The possibility of damage to the apparatus or injury to the apparatus operator is greatly reduced.

Various modifications will become possible for those skilled in the art after receiving the teachings of the present disclosure without departing from the scope thereof. For example, the control circuits 31 and 61 may be modified so as to toggle the tray 23 after a predetermined number of copies have been produced. The number of copies may be preset by means of a dial. Alternatively, after a number of copies have been produced a button may be pressed causing the tray 23 to be toggled. Subsequently, after this number of copies have been produced again the tray 23 will again be toggled. This modification may be readily embodied by one skilled in the art using a preset counter, copy counter and comparator, although not illustrated.

It is further possible to modify the circuits 31 and 61 to function in conjunction with an advanced automatic document feed device which is capable of recirculating a document to produce more than one copy thereof or a copying machine which develops a single electrostatic image a plurality of times to produce a plurality of toner images which are transferred and fixed to respective copy sheets. Such an apparatus is capable of producing more than one copy of each document in the automatic feed mode. The circuit 31 or 61 may be modified to toggle the tray 23 to sort the copies either by sets or by documents. Where the number of copies and also the number of documents may be preset into the apparatus, suitable decision logic may be provided to sort the copies in sets or by documents in accordance with some predetermined criteria. For example, if the number of documents is larger than the number of copies to be produced per document, the sorting will be by sets rather than by documents and vice-versa.

It will be understood by those skilled in the art that the control circuit 31 or 61 or a modification thereof may be utilized to produce the SORT signals for toggling any of the sorting devices disclosed herein or any other known sorting device and conversely that any other known type of control circuit capable of producing signals for toggling a sorting device may be used to operate any of the sorting devices disclosed herein.

What is claimed is:

1. A reproduction apparatus including a reproduction machine and sorting means, the reproduction machine reproducing original documents on sheets and discharging the sheets onto the sorting means, the sorting means having means movable so as to stack the sheets in a first position or a second position on the sorting means and being toggled between the first and second positions in response to electrical sort signals, characterized by comprising:

control means for producing a sort signal after termination of a reproduction operation by the reproduction machine when a predetermined operation is performed within a predetermined length of time after said termination.

2. An apparatus as in claim 1, in which said predetermined operation comprises initiation of a next reproduction operation by the reproduction machine.

3. An apparatus as in claim 2, in which the reproduction operation comprises reproducing a single original document on a plurality of sheets.

4. An apparatus as in claim 1, in which said predetermined operation comprises removing an original document from the reproduction machine.

5. A reproduction apparatus including a reproduction machine and sorting means, the reproduction machine reproducing original documents on sheets and discharging the sheets onto the sorting means, the sorting means having means movable so as to stack the sheets in a first position or a second position on the sorting means and being toggled between the first and second positions in response to electrical sort signals, characterized by comprising:

control means for producing a sort signal after termination of a reproduction operation by the reproduction machine when a predetermined operation is performed within a predetermined length of time after said termination;

the reproduction machine comprising original document feed means having a discharge portion with a cover, said predetermined operation comprising opening the cover.

6. An apparatus as in claim 5, in which said predetermined operation further comprises initiation of a next reproduction operation by the reproduction machine after opening the cover.

7. A reproduction apparatus including a reproduction machine and sorting means, the reproduction machine reproducing original documents on sheets and discharging the sheets onto the sorting means, the sorting means having means movable so as to stack the sheets in a first position or a second position on the sorting means and being toggled between the first and second positions in response to electrical sort signals, characterized by comprising:

control means for producing a sort signal after termination of a reproduction operation by the reproduction machine when a predetermined operation is performed within a predetermined length of time after said termination;

the reproduction machine being operative in an automatic feed mode for reproducing a plurality of original documents on respective sheets or in a multiple reproduction mode for reproducing a single original document on a plurality of sheets, the reproduction machine comprising original document feed means having a discharge portion with a cover, the document feed means feeding the original documents sequentially into the discharge portion in the automatic feed mode, said predetermined operation comprising opening the cover in the automatic feed mode and initiating a next reproduction operation by the reproduction machine in the multiple reproduction mode respectively.

8. A reproduction apparatus including a reproduction machine and sorting means, the reproduction machine reproducing original documents on sheets and discharging the sheets onto the sorting means, the sorting means having means movable so as to stack the sheets in a first position or a second position on the sorting means and being toggled between the first and second positions in response to electrical sort signals, characterized by comprising:

control means for producing a sort signal after termination of a reproduction operation by the reproduction machine when a predetermined operation is performed within a predetermined length of time after said termination;

the sorting means comprising a fixed receiving tray onto which the sheets are discharged from the reproduction machine, the tray being formed with an elongated slot therethrough, the sorting means further comprising a sheet engaging member, drive means for toggling the engaging member between first and second positions at opposite respective ends of the slot in response to the sort signals and guide means for elevating the engaging member upwardly through the slot only in a central portion of the slot.

9. An apparatus as in claim 8, in which the drive means comprises a crank-rocker mechanism having two stable positions corresponding to the first and second positions of the engaging member respectively.

10. An apparatus as in claim 8, in which the guide means comprises a cam.

11. A reproduction apparatus including a reproduction machine and sorting means, the reproduction machine reproducing original documents on sheets and discharging the sheets onto the sorting means, the sorting means having means movable so as to stack the sheets in a first position or a second position on the sorting means and being toggled between the first and second positions in response to electrical sort signals, characterized by comprising:

control means for producing a sort signal after termination of a reproduction operation by the reproduction machine when a predetermined operation is performed within a predetermined length of time after said termination;

the sorting means comprising a fixed receiving tray onto which the sheets are discharged by the reproduction machine and a sheet engaging member which is movable between a first position above the tray and a second position horizontally spaced from the tray, the sheets being received on the engaging member when the engaging member is in the first position thereof and being displaced by the engaging member when the engaging member is moved from the first position to the second position thereof, the sorting means further comprising drive means for toggling the engaging member between the first and second positions thereof in response to the sort signals.

12. An apparatus as in claim 11, in which the sorting means further comprises guide means for guiding the engaging member in such a manner that the engaging member is higher in the second position than in the first position thereof.

13. An apparatus as in claim 12, in which the guide means comprises a cam.

14. An apparatus as in claim 12, in which the drive means is constructed to rotatably toggle the engaging member between the first and second positions thereof, the drive means comprising a vertical rotary shaft, the engaging member being integrally rotatable with an axially slidable on the shaft.

15. An apparatus as in claim 11, in which the drive means is constructed to rotatably toggle the engaging member between the first and second positions thereof.

16. An apparatus as in claim 11, in which the drive means is constructed to linearly toggle the engaging member between the first and second positions thereof.

17. An apparatus as in claim 16, in which the drive means comprises a crank-slider mechanism.

* * * * *